United States Patent [19]

Jung et al.

[11] Patent Number: 5,428,136
[45] Date of Patent: Jun. 27, 1995

[54] WATER-INSOLUBLE AZO COLORANTS HAVING TWO AZO GROUPS AND A 1,4-BIS (ACETOACETYLAMINO) BENZENE COUPLING COMPONENT

[75] Inventors: Rüdiger Jung; Joachim Weide, both of Kelkheim; Hans J. Metz, Darmstadt, all of Germany

[73] Assignee: Hoechst AG, Frankfurt, Germany

[21] Appl. No.: 99,715

[22] Filed: Jul. 29, 1993

[30] Foreign Application Priority Data

Jul. 31, 1992 [DE] Germany ............ 42 25 295.4

[51] Int. Cl.⁶ ............ C09B 33/153; C09B 63/00; D06P 1/44; C09D 11/02; C09D 17/00
[52] U.S. Cl. ............ 534/741; 8/506; 8/508; 8/513; 8/687; 8/919; 8/924; 8/928; 106/22 K; 524/83; 524/190; 534/573; 534/581; 534/887; 534/575
[58] Field of Search ............ 534/741; 524/83, 190; 8/506, 508, 513, 687, 919, 924, 928; 106/22 K

[56] References Cited

U.S. PATENT DOCUMENTS

| | | |
|---|---|---|
| 3,513,154 | 5/1970 | Towle et al. ............ 534/748 |
| 3,801,587 | 4/1974 | Loewe et al. ............ 548/152 |
| 4,234,480 | 11/1980 | Kramer ............ 534/741 |

FOREIGN PATENT DOCUMENTS

| | | |
|---|---|---|
| 1135688 | 11/1982 | Canada . |
| 0025164 | 3/1981 | European Pat. Off. . |
| 0260563 | 3/1986 | European Pat. Off. . |
| 0183151 | 6/1986 | European Pat. Off. . |
| 2401197 | 3/1979 | France . |
| 1544453 | 4/1970 | Germany . |
| 2106200 | 9/1972 | Germany . |
| 2125193 | 11/1972 | Germany . |
| 3443595 | 5/1986 | Germany ............ 534/741 |
| 1066769 | 4/1967 | United Kingdom . |

OTHER PUBLICATIONS

Abstract of DE 2,125,193 (Nov. 30, 1972).

Primary Examiner—Mary C. Lee
Assistant Examiner—Fiona T. Powers
Attorney, Agent, or Firm—Connolly & Hutz

[57] ABSTRACT

Disazo compounds of the formula (I)

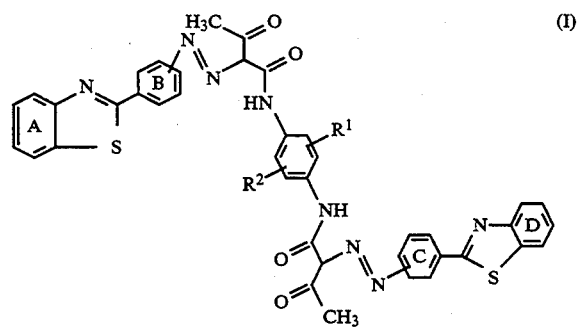

in which $R^1$ and $R^2$ are identical or different and are a hydrogen or halogen atom or a $C_1$–$C_4$-alkyl, $C_1$–$C_4$-alkoxy, $C_1$–$C_5$-alkoxycarbonyl, nitro, cyano or trifluoromethyl group and the rings A, B, C and D independently of one another are unsubstituted or contain one or more substituents from the group comprising $C_1$–$C_4$-alkyl, $C_1$–$C_4$-alkoxy, carboxyl, $C_1$–$C_5$-carbalkoxy, $C_2$–$C_5$-alkanoyl, benzoyl, acyloxy, acylamino, unsubstituted or N-mono- or N,N-disubstituted carbamoyl or unsubstituted or N-mono- or N,N-disubstituted sulfamoyl, possible substituents being $C_1$–$C_4$-alkyl or mono- to trisubstituted phenyl; $C_1$–$C_4$-alkylamino or phenylamino; $C_1$–$C_4$-alkylsulfonyl or phenylsulfonyl; phenylsulfonylamino; cyano; halogen, nitro and trifluoromethyl, are suitable for coloring naturally occurring and synthetic materials, for formulating enamels, emulsion paints and printing inks, for spin coloring artificial silk and for coloring paper.

12 Claims, No Drawings

WATER-INSOLUBLE AZO COLORANTS HAVING TWO AZO GROUPS AND A 1,4-BIS (ACETOACETYLAMINO) BENZENE COUPLING COMPONENT

The present invention relates to the technical field of azo colorants having two azo groups.

Disazo pigments and processes for their preparation are described, for example, in GB-A-10 66 769, EP-A-25164 (CA-A-11 35 688) and U.S. Pat. No. 3,513,154.

The present invention was based on the object of providing novel water-insoluble azo colorants having two azo groups.

The present invention relates to disazo compounds of the formula (I)

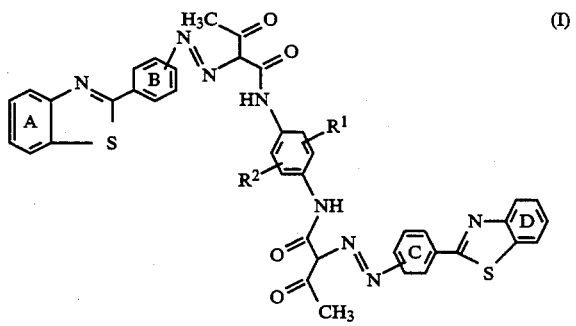

(I)

in which $R^1$ and $R^2$ are identical or different and are a hydrogen or halogen atom or a $C_1$–$C_4$-alkyl, $C_1$–$C_4$-alkoxy, $C_1$–$C_5$-alkoxycarbonyl, nitro, cyano or trifluoromethyl group and the rings A, B, C and D independently of one another are unsubstituted or contain one or more, preferably 1 to 3, substituents from the group comprising $C_1$–$C_4$-alkyl, preferably methyl or ethyl; $C_1$–$C_4$-alkoxy, preferably methoxy or ethoxy; carboxyl; $C_1$–$C_5$-carbalkoxy, preferably carbomethoxy, carboethoxy, carbopropoxy, carboisopropoxy or carbobutoxy; $C_2$–$C_5$-alkanoyl, preferably acetyl, or benzoyl; acyloxy, preferably acetoxy; acylamino, preferably acetylamino or benzoylamino; unsubstituted or N-mono- or N,N-disubstituted carbamoyl or unsubstituted or N-mono- or N,N-disubstituted sulfamoyl, possible substituents being $C_1$–$C_4$-alkyl or mono- to trisubstituted phenyl; $C_1$–$C_4$-alkylamino or phenylamino; $C_1$–$C_4$-alkylsulfonyl or phenylsulfonyl; phenylsulfonylamino; cyano; halogen, preferably chlorine or bromine; and nitro and trifluoromethyl.

The formula (I) is to be understood as an idealized formula and also includes the corresponding tautomeric compounds, as well as the possible configurational isomers of each tautomeric form. Compounds of the formula (I) are very largely in the hydrazone form. The idealized formula (I) therefore also includes, above all, the bishydrazone form.

Compounds which are of particular interest are those of the formula (II)

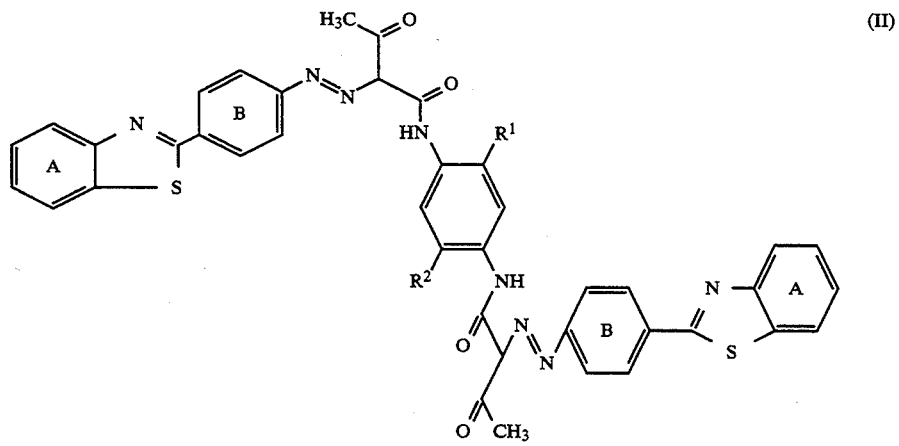

(II)

in which $R^1$ and $R^2$ have the abovementioned meanings and the rings A and B in each case independently of one another are substituted by 1 to 3 of the abovementioned radicals.

Compounds of the formula (II) which are of particular interest are those in which $R^1$ and $R^2$ are identical or different and are hydrogen, chlorine, bromine, trifluoromethyl, methyl, ethyl, methoxy, ethoxy, propoxy, butoxy, cyano, nitro, ethoxycarbonyl or methoxycarbonyl.

The coupling component on which the compound of the formula (II) is based is a compound of the formula (VI)

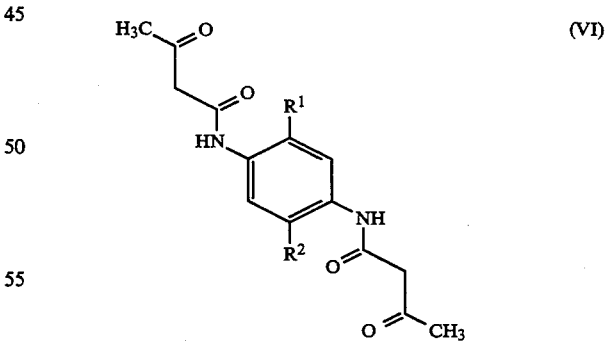

(VI)

Compounds of the formula (II) which are of particular interest are those in which the coupling component of the formula (VI) on which the formula (II) is based is the compound 1,4-bis(acetoacetylamino)benzene, 2-chloro-1,4-bis(acetoacetylamino)benzene, 2-bromo-1,4-bis(acetoacetylamino)benzene, 2-trifluoromethyl-1,4-bis(acetoacetylamino)benzene, 2-methoxycarbonyl-1,4-bis(acetoacetylamino)benzene, 2-ethoxycarbonyl-1,4-bis(acetoacetylamino)benzene, 2-cyano-1,4-bis-(acetoacetylamino)benzene, 2-methyl-1,4-bis- (acetoacetylamino)benzene, 2-methoxy-1,4-bis-(acetoacetylamino)benzene, 2-ethoxy-1,4-bis-(acetoacetylamino)benzene, 2-propoxy-1,4-bis-(acetoacetylamino)benzene, 2-iso-propoxy-1,4-bis-(acetoacetylamino)benzene, 2-butoxy-1,4-bis-(acetoacetylamino)benzene, 2-nitro-1,4-bis-(acetoacetylamino)benzene, 2,5-dimethyl-1,4-bis-(acetoacetylamino)benzene, 2,5-diethoxy-1,4-bis-(aacetoacetylamino)benzene, 2-ethoxy-5-methoxy-1,4-bis(acetoacetylamino)benzene, 2,5-dichloro-1,4-bis-(acetoacetylamino)benzene, 2-chloro-5-methyl-1,4-bis-(acetoacetylamino)benzene, 2-chloro-5-methoxy-1,4-bis(acetoacetylamino)benzene, 2-chloro-5-ethoxy-1,4-bis(acetoacetylamino)benzene, 2,5-dimethyl-1,4-bis-(acetoacetylamino)benzene, 2-methyl-5-methoxy-1,4-bis(acetoacetylamino)benzene, 2-methyl-5-ethoxy-1,4-bis(acetoacetylamino)benzene, 2-methyl-5-propoxy-1,4-bis(acetoacetylamino)benzene, 2-methyl-5-isopropoxy-1,4-bis(acetoacetylamino)benzene or 2-methyl-5-butoxy-1,4-bis(acetoacetylamino)benzene. The diazo component(s) on which a compound of the formula (I) is based is a 2-(aminophenyl) benzothiazole of the formula (III) or are two different 2-(aminophenyl) benzothiazoles of the formula (III)

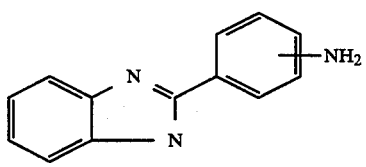

(III)

in which the aromatic rings are unsubstituted or substituted as described above. Coupling components which are of particular interest in the context of the present invention are 2-(4-aminophenyl)benzothiazole, 2-(3-aminophenyl)benzothiazole and 2-(2-aminophenyl)benzothiazole, as well as substituted 2-(4-aminophenyl)benzothiazoles, 2-(3-aminophenyl)benzothiazoles and 2-(2-aminophenyl)benzothiazoles, which carry, independently of one another, on the phenyl ring in the 2-position of the benzothiazole system and on the benzene nucleus of the benzothiazole system in each case one or more substituents from the group comprising $C_1$–$C_4$-alkyl, preferably methyl or ethyl; $C_1$–$C_4$-alkoxy, preferably methoxy or ethoxy; carboxyl; carbalkoxy, preferably carbomethoxy, carboethoxy, carbopropoxy, carboisopropoxy or carbobutoxy; $C_2$–$C_5$-alkanoyl, preferably acetyl, or benzoyl; acyloxy, preferably acetoxy; acylamino, preferably acetylamino or benzoylamino; unsubstituted or, N-mono- or N,N-disubstituted carbamoyl or unsubstituted or, N-mono- or N,N-disubstituted sulfamoyl, possible substituents being $C_1$–$C_4$-alkyl or mono- to trisubstituted phenyl; $C_1$–$C_4$-alkylamino or phenylamino; $C_1$–$C_4$-alkylsulfonyl or phenylsulfonyl; phenylsulfonylamino; cyano; halogen, preferably chlorine or bromine; and nitro and trifluoromethyl.

Examples of substituted 2-(aminophenyl)benzothiazoles are, according to the invention, 6-methoxy-2-(4-amino-3-nitrophenyl)benzothiazole, 2-(4-amino-3-nitrophenyl)benzothiazole, 4,7-dimethyl-2-(4-aminophenyl)benzothiazole, 5-carboxy-2-(4-aminophenyl)-benzothiazole, 5-carbamoyl-2-(4-aminophenyl)benzothiazole, 5-sulfamoyl-2-(3-amino-4-methoxyphenyl)benzothiazole, 5-sulfamoyl-2-(4-aminophenyl)benzothiazole, 6-ethoxy-2-(3-amino-4-nitrophenyl)benzothiazole, 6-methyl-2-(4-amino-3,5-dibromophenyl)benzothiazole, 2-(3-amino-5-chlorophenyl)benzothiazole, 6-methoxy-2-(4-aminophenyl)benzothiazole, 6-dimethylamino-2-(4-aminophenyl)benzothiazole, 2-(2-amino-3-chloro-5-nitrophenyl)benzothiazole, 5-chloro-2-(2-amino-3-bromo-5-nitrophenyl)benzothiazole, 2-(2-amino-3-bromo-5-nitrophenyl)benzothiazole, 5-chloro-2-(2-amino-5-nitrophenyl)benzothiazole, 2-(2-amino-5-nitrophenyl)benzothiazole, 5-methyl-2-(4-aminophenyl)benzothiazole, 4-methyl-2-(4-aminophenyl)benzothiazole, 6-carboxy-2-(4-aminophenyl)benzothiazole, 6-methyl-2-(4-aminophenyl)benzothiazole, 6-methyl-2-(3-amino-4-dimethylaminophenyl)benzothiazole, 4,6-dimethyl-2-(2-amino-5-methylphenyl)benzothiazole and 4,6-dimethyl-2-(4-amino-3-methylphenyl)benzothiazole.

Examples of the diazo component(s) on which a compound of the formula (II) is based are 2-(4-aminophenyl)benzothiazole which is unsubstituted or substituted as described above, or a combination of two different 2-(4-aminophenyl) benzothiazoles of those mentioned.

The diazo component which is particularly preferred according to the invention is 6-methyl-2-(4-aminophenyl)benzothiazole.

Azo colorants which are particularly relevant according to the invention are those of which the coupling component is 1,4-bis(acetoacetylamino)benzene, 2,5-dimethyl-1,4-bis(acetoacetylamino)benzene, 2-chloro-1,4-bis(acetoacetylamino)benzene, 2,5-dichloro-1,4-bis(acetoacetylamino)benzene, 2-methyl-5-methoxy-1,4-bis(acetoacetylamino)benzene, 2-methyl-1,4-bis(acetoacetylamino)benzene, 2-methoxy-1,4-bis-(acetoacetylamino)benzene or 2,5-dimethoxy-1,4-bis-(acetoacetylamino)benzene and of which the diazo component is 6-methyl-2-(4-aminophenyl)benzothiazole, 2-(4-aminophenyl)benzothiazole, 2-(2-amino-5-nitrophenyl)benzothiazole or a combination thereof.

The present invention also relates to a process for the preparation of the compounds of the formula (I) according to the invention, which comprises diazotizing one or more different, preferably one or two, amines of the formula (III), in which the aromatic rings are unsubstituted or substituted in accordance with formula (I), and reacting the diazotization product with 0.45 to 0.55 mol, preferably with 0.50 to 0.53 mol, per mol of amine of the formula (III) in total, of one or more different coupling components of the formula (IV)

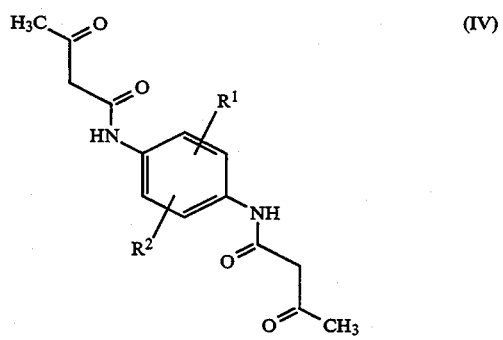

(IV)

in which $R^1$ and $R^2$ have the meanings defined above. The process according to the invention is carried out in particular by diazotizing an amine of the formula (V)

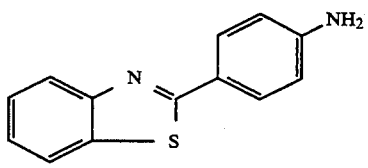

(V)

in which the aromatic rings are unsubstituted or substituted in accordance with formula (II), and reacting the diazotization product with 0.50 to 0.53 mol, per mol of amine of the formula (V), of a compound of the abovementioned formula (VI).

The preparation of the 2-(aminophenyl) benzothiazoles of the formula (III) is described in DE-A-2 125 193 and in U.S. Pat. No. 3,801,587.

The 1,4-bis(acetoacetylamino)benzenes employed according to the invention as coupling components can be prepared in the customary manner from the corresponding p-phenylenediamines by reaction with diketene or acetoacetic ester.

The azo coupling for preparation of the compounds of the formula (I) according to the invention is carried out in an aqueous medium, if appropriate in the presence of nonionic, anionic or cationic surface-active substances. If appropriate, other auxiliaries, such as naturally occurring or synthetic resins or resin derivatives, or customary additives for paints, printing inks or plastics, can also be used in the preparation process for the colorants. The coupling can also be carried out entirely or partly in organic solvents.

The compounds of the formula (I) according to the invention are useful water-insoluble colorants and can be isolated in the customary manner after the coupling reaction. It is often expedient to subject the azo colorants obtained after the coupling reaction to an aftertreatment to achieve the full tinctorial strength and a particularly favorable crystal structure.

For example, for this purpose, the moist or dried and ground pigments can be heated for some time, preferably, 0.5 to 4 hours, in organic solvents, such as, for example, in pyridine, N-methyl-2-pyrrolidone, dimethylformamide, dimethyl sulfoxide, alcohols, chlorobenzene, dichlorobenzene, glacial acetic acid, quinoline, glycol, nitrobenzene or aromatic hydrocarbons, if appropriate under increased pressure. In some cases, the products are also already successfully converted into a favorable crystal structure by heating in water, if appropriate under pressure and if appropriate with addition of dispersing agents or organic solvents, for example of the abovementioned type.

The compounds of the formula (I) according to the invention which contain potentially lake-forming carboxyl groups furthermore can be converted into colored lakes by known processes.

The present invention also relates to the use of the water-insoluble compounds of the formula (I) according to the invention for coloring naturally occurring and synthetic materials. For example, the compounds according to the invention are suitable for pigmenting polystyrene, polyolefins, preferably polyethylene or polypropylene, polyacrylic compounds, polyvinyl compounds, preferably polyvinyl chloride or polyvinyl acetate, polyesters, rubber, case in resins or silicone resins. The compounds according to the invention furthermore are suitable for the preparation of printing inks, for formulation of enamels and emulsion paints, and for printing onto substrates, such as textile fibers, or also onto other sheet-like structures, such as, for example, paper. The pigments according to the invention, preferably in finely divided form, can also be used for spin coloring artificial silk, preferably of viscose or cellulose ethers, cellulose esters, polyamides, polyurethanes or polyglycol terephthalates, or for coloring paper.

The present invention also relates to colorant formulations comprising at least one of the compounds according to formula (I) or (II).

In the following examples, "parts" relate to the weight, and parts by volume bear the same relationship to parts by weight as the liter to the kilogram. NMP means N-methylpyrrolidone.

Example 1:

Diazonium salt solution:

24.0 parts of 6-methyl-2-(4-aminophenyl)benzothiazole are stirred in 150 parts by volume of glacial acetic acid and 30 parts by volume of 31% strength hydrochloric acid at about 22° C. for two hours. The mixture is cooled to 5° C. by addition of ice, and 14.3 parts by volume of 38% strength sodium nitrite solution are added dropwise in the course of 15 minutes. The mixture is stirred at 5° C. to 10° C. for 90 minutes. The diazonium salt solution thus obtained is clarified by filtration and the excess nitrite is destroyed with amidosulfonic acid.

Solution of the coupling component:

14.2 parts of 1,4-bis(acetoacetylamino)benzene are dissolved in 250 parts by volume of water and 15 parts by volume of 33% strength sodium hydroxide solution. 100 parts of ice are added to this solution.

Coupling:

The diazonium salt solution, 150 parts of ice and 4 parts of a 30% strength aqueous solution of a coconut alkyldimethylamine oxide are initially introduced into a reaction vessel for the azo coupling, and the pH is adjusted to 3.9 to 4.1 with 225 parts by volume of 4 molar sodium acetate solution. The solution of the coupling component is added to this mixture in the course of 30 to 40 minutes. When the coupling has ended, the pigment suspension is heated to 98° C. by passing in steam, and this temperature is maintained for 30 minutes. The mixture is allowed to cool to 80° C. and the pigment is filtered off with suction and washed with water. After drying at 65° C., the pigment is ground.

After-treatment:

The ground pigment is heated to 120° C. in 600 parts by volume of dimethylformamide, while stirring, and is kept at this temperature for 2 hours. It is filtered off with suction, washed with dimethylformamide and then with acetone and dried. After grinding, 29.3 parts of a yellow pigment which has a specific surface area of 47 $m^2/g$ and decomposes above 355° C. are obtained. The pigment has a high tinctorial strength and, after incorporation into a printing ink, produces yellow prints having a pure shade.

IR spectrum (KBr): 1660, 1608, 1573, 1527, 1502, 1486, 1411, 1360, 1291, 1270, 1211, 1187, 1168, 970, 951 $cm^{-1}$.

Example 2:

Diazonium salt solution as in Example 1.

Solution of the coupling component:

15.6 parts of 2,5-dimethyl-1,4-bis(acetoacetylamino)benzene are dissolved in 250 parts by volume of water and 15 parts by volume of 33% strength sodium hydroxide solution. 100 parts of ice are added to this solution.

Coupling is carried out in the same manner as in Example 1.

After-treatment:

The ground pigment is heated to 130° C. in 700 parts by volume of N-methyl-2-pyrrolidone (NMP), while stirring, and kept at this temperature for 3.5 hours. It is filtered off with suction, washed with NMP and then with acetone and dried. After grinding, 31.8 parts of a reddish-tinged yellow pigment which decomposes above 350° C. are obtained. The pigment has a high tinctorial strength and, after incorporation into polyvinyl chloride, into a printing ink or into an alkyd/melamine stoving enamel, produces reddish-tinged yellow colorations. It has an excellent fastness to overlacquering in the enamel coating.

IR spectrum (KBr): 1659, 1607, 1572, 1510, 1453, 1412, 1358, 1274, 1224, 1166, 1111, 972, 951, 830, 814 cm$^{-1}$.

Example 3:

Diazonium salt solution as in Example 1.

Solution of the coupling component:

16.0 parts of 2-chloro-1,4-bis(acetoacetylamino)benzene are dissolved in 250 parts by volume of water and 15 parts by volume of 33% strength sodium hydroxide solution. 100 parts of ice are added to this solution.

Coupling is carried out in the same manner as in Example 1.

After-treatment:

The ground pigment is heated to 145° C. in 800 parts by volume of dimethylformamide, while stirring, and kept at this temperature for 1.5 hours. It is filtered off with suction, washed with dimethylformamide and then with acetone and dried. After grinding, 32.1 parts of a reddish-tinged yellow pigment which decomposes above 353° C. are obtained. When incorporated into polyvinyl chloride, the pigment produces reddish-tinged yellow colorations with a good fastness to bleeding.

IR spectrum (KBr): 1668, 1606, 1571, 1521, 1484, 1406, 1359, 1317, 1291, 1273, 1258, 1223, 1186, 1168, 967, 952, 833, 811 cm$^{-1}$.

Example 4:

Diazonium salt solution as in Example 1.

Solution of the coupling component:

17.8 parts of 2,5-dichloro-1,4-bis(acetoacetylamino)benzene are dissolved in 250 parts by volume of water and 15 parts by volume of 33% strength sodium hydroxide solution. 100 parts of ice are added to this solution.

Coupling is carried out in the same manner as in Example 1.

After-treatment:

The ground pigment is heated to 140° C. in 800 parts by volume of NMP, while stirring, and kept at this temperature for 3.5 hours. It is filtered off with suction, washed with NMP and then with acetone and dried. After grinding, 31.2 parts of a reddish-tinged yellow pigment which has a melting point above 350° C. are obtained. When incorporated into a printing ink, this pigment of high tinctorial strength produces transparent reddish-tinged yellow prints with a pure color shade.

IR spectrum (KBr): 1668, 1606, 1561, 1512, 1484, 1383, 1358, 1317, 1262, 1216, 1169, 967, 952, 833, 812, 777 cm$^{-1}$.

Example 5:

Diazonium salt solution as in Example 1.

Solution of the coupling component:

16.5 parts of 2-methoxy-5-methyl-1,4-bis-(acetoacetylamino)benzene are dissolved in 250 parts by volume of water and 15 parts by volume of 33% strength sodium hydroxide solution. 100 parts of ice are added to this solution.

Coupling is carried out in the same manner as in Example 1.

After-treatment:

The ground pigment is heated to 140° C. in 700 parts by volume of NMP, while stirring, and kept at this temperature for 1 hour. It is filtered off with suction, washed with NMP and then with acetone and dried. After grinding, 30.6 parts of an orange-colored pigment which decomposes above 348° C. are obtained. After incorporated into an alkyd/melamine stoving enamel, the pigment produces orange-colored enamel coatings having an excellent fastness to over-lacquering.

IR spectrum (KBr): 1663, 1606, 1570, 1508, 1486, 1454, 1415, 1290, 1268, 1221, 1166, 967, 951, 817 cm$^{-1}$.

Example 6:

Diazonium salt solution as in Example 1.

Solution of the coupling component:

14.9 parts of 2-methyl-1,4-bis(acetoacetylamino)benzene are dissolved in 250 parts by volume of water and 15 parts by volume of 33% strength sodium hydroxide solution. 100 parts of ice are added to this solution.

Coupling is carried out in the same manner as in Example 1.

After-treatment:

The ground pigment is heated to 140° C. in 700 parts by volume of NMP, while stirring, and kept at this temperature for 3.5 hours. It is filtered off with suction, washed with NMP and then with acetone and dried. After grinding, 35.8 parts of a yellow pigment which has a specific surface area of 63 m$^2$/g and decomposes above 345° C. are obtained. The pigment has a high tinctorial strength and colors polyvinyl chloride in a pure reddish-tinged yellow color shade. When incorporated into an alkyd/melamine stoving enamel, pure, reddish-tinged yellow enamel coatings with a very good fastness to overlacquering are obtained.

IR spectrum (KBr): 1659, 1608, 1573, 1517, 1488, 1452, 1418, 1358, 1270, 1229, 1211, 1167, 971, 949, 816 cm$^{-1}$.

Example 7:

Diazonium salt solution as in Example 1.

Solution of the coupling component:

17.3 parts of 2,5-dimethoxy-1,4-bis-(acetoacetylamino)benzene are dissolved in 250 parts by volume of water and 15 parts by volume of 33% strength sodium hydroxide solution. 100 parts of ice are added to this solution.

Coupling is carried out in the same manner as in Example 1.

After-treatment:

The ground pigment is heated to 140° C. in 600 parts by volume of NMP, while stirring, and kept at this temperature for 1 hour. It is filtered off with suction, washed with NMP and then with acetone and dried. After grinding, 33.6 parts of an orange-colored pigment with a melting point above 350° C. are obtained. When incorporated into a printing ink, this pigment of good tinctorial strength produces pure orange-colored prints.

IR spectrum (KBr): 1661, 1606, 1559, 1511, 1485, 1453, 1414, 1358, 1292, 1264, 1215, 1165, 967, 952, 822 cm$^{-1}$.

Example 8:

Diazonium salt solution as in Example 1.

Solution of the coupling component:

15.8 parts of 2-methoxy-1,4-bis(acetoacetylamino)benzene are dissolved in 250 parts by volume of water and 15 parts by volume of 33% strength sodium hydroxide solution. 100 parts of ice are added to this solution.

Coupling is carried out in the same manner as in Example 1.

After-treatment:

The ground pigment is heated to 135° C. in 600 parts by volume of NMP, while stirring, and kept at this temperature for 1 hour. It is filtered off with suction, washed with NMP and then with acetone and dried. After grinding, 31.4 parts of a reddish-tinged yellow pigment which decomposes above 342° C. are obtained. When incorporated into an alkyd/melamine stoving enamel, opaque reddish-tinged yellow enamel coatings having a perfect fastness to overlacquering can be produced from this pigment.

IR spectrum (KBr): 1661, 1606, 1568, 1516, 1499, 1485, 1450, 1417, 1359, 1316, 1284, 1266, 1219, 1186, 1165, 967, 949, 812 cm$^{-1}$.

Example 9:

Diazonium salt solution as in Example 1.

Solution of the coupling component:

12.8 parts of 1,4-bis(acetoacetylamino)benzene and 1.8 parts of 2,5-dichloro-1,4-bis(acetoacetylamino)benzene are dissolved in 250 parts by volume of water and 15 parts by volume of 33% strength sodium hydroxide solution. 100 parts of ice are added to this solution.

Coupling is carried out in the same manner as in Example 1.

After-treatment:

The ground pigment is heated to 150° C. in 700 parts by volume of NMP, while stirring, and kept at this temperature for 2 hours. It is filtered off with suction, washed with NMP and then with acetone and dried. After grinding, 32.1 parts of a yellow pigment which decomposes above 353° C. are obtained. The pigment colors polyvinyl chloride in a pure yellow color shade with good fastness to bleeding.

IR spectrum (KBr): 1660, 1608, 1572, 1527, 1500, 1487, 1454, 1411, 1359, 1291, 1268, 1210, 1187, 1168, 970, 951, 839, 817 cm$^{-1}$.

Example 10:

Diazonium salt solution as in Example 1.

Solution of the coupling component:

12.8 parts of 1,4-bis(acetoacetylamino)benzene and 1.7 parts of 2-methoxy-5-methyl-1,4-bis-(acetoacetylamino)benzene are dissolved in 250 parts by volume of water and 15 parts by volume of 33% strength sodium hydroxide solution. 100 parts of ice are added to this solution.

Coupling is carried out in the same manner as in Example 1.

After-treatment:

The ground pigment is heated to 150° C. in 700 parts by volume of NMP, while stirring, and kept at this temperature for 2 hours. It is filtered off with suction, washed with NMP and then with acetone and dried. After grinding, 32.3 parts of a yellow pigment which decomposes above 351° C. are obtained. This disazo pigment of good tinctorial strength colors polyvinyl chloride in a pure yellow color shade.

IR spectrum (KBr): 1660, 1608, 1573, 1527, 1501, 1486, 1412, 1360, 1291, 1271,. 1211, 1187, 1167, 971, 951, 833, 817 cm$^{-1}$.

Example 11:

The procedure is as in Example 1, but the crude pigment is not dried and the moist filtercake is employed in the after-treatment step.

For this, 100 parts of filtercake having a solids content of 18% are heated to 150° C. with 157 parts of iso-butanol in a stirred autoclave, and kept at this temperature for one hour. After cooling to 80° C., the iso-butanol is removed by means of steam distillation, and the pigment is then filtered off with suction, washed with water, dried at 65° C. and ground. 15.8 parts of a yellow pigment which has a specific surface area of 60 m$^2$/g and decomposes above 355° C. are obtained.

Example 12:

The procedure is as in Example 6, but the crude pigment is not dried, and the moist filtercake is employed in the after-treatment step.

For this, 200 parts of filtercake having a solids content of 15.2% are heated to 150° C. with 234 parts of iso-butanol in a stirred autoclave and kept at this temperature for one hour. After cooling to 80° C., the iso-butanol is removed by steam distillation, and the pigment is then filtered off with suction, washed with water, dried at 65° C. and ground. 27.1 parts of a yellow pigment which has a specific surface area of 67 m$^2$/g and decomposes above 345° C. are obtained.

Example 13:

Diazonium salt solution:

22.6 parts of 2-(4-aminophenyl)benzothiazole are stirred in 50 parts by volume of glacial acetic acid and 30 parts by volume of 31% strength hydrochloric acid at about 22° C. for two hours. 300 parts by volume of water are added, and the mixture is cooled to 5° C. by addition of ice. 14.3 parts by volume of 38% strength sodium nitrite solution are added dropwise in the course of 15 minutes. Thereafter, the mixture is stirred at 5° C. to 10° C. for 90 minutes. The excess nitrite is then destroyed by addition of amidosulfonic acid.

Dissolving and precipitating the coupling component:

14.2 parts of 1,4-bis(acetoacetylamino)benzene are dissolved in 250 parts by volume of water and 15 parts by volume of 33% strength sodium hydroxide solution. 125 parts of ice are added to this solution. The coupling component is precipitated by addition of 28 parts by volume of 50% strength acetic acid in the course of one minute.

Coupling:

The diazonium salt suspension, 150 parts of ice and 4 parts of a 30% strength aqueous solution of a coconut alkyl-dimethylamine oxide are initially introduced into a reaction vessel for azo coupling, and the pH is brought to 4 with about 150 parts by volume of 4 molar sodium acetate solution. The suspension of the coupling component is added to this mixture in the course of 30 to 40 minutes. When the coupling has ended, the pigment suspension is heated to 98° C. by passing in steam, and this temperature is maintained for 30 minutes. The mixture is allowed to cool to 80° C. and the pigment is filtered off with suction and washed with water. After drying at 65° C., the pigment is ground.

After-treatment:

The ground pigment is heated to 130° C. in 500 parts by volume of NMP, while stirring, and kept at this temperature for 1 hour. The pigment is filtered off with suction, washed with NMP and then with acetone and dried. After grinding, 28.4 parts of a yellow pigment which does not melt up to 350° C. are obtained.

IR spectrum (KBr): 1668, 1576, 1528, 1502, 1483, 1414, 1358, 1316, 1291, 1273, 1212, 1188, 1167, 966, 952, 831, 753 cm$^{-1}$.

Example 14:

Diazonium salt solution:

27.1 parts of 2-(2-amino-5-nitrophenyl)benzothiazole are stirred in 250 parts by volume of glacial acetic acid and 30 parts by volume of 31% strength hydrochloric acid at about 22° C. for two hours. 300 parts by volume of water are added and the mixture is cooled to 5° C. by addition of ice. 14.3 parts by volume of 38% strength sodium nitrite solution are added dropwise in the course of 15 minutes. The mixture is subsequently stirred at 5° C. to 10° C. for 90 minutes. The excess nitrite is then destroyed by addition of amidosulfonic acid, and the diazonium salt suspension is diluted with 800 parts by volume of water.

Dissolving and precipitating the coupling component:

4.2 parts of 1,4-bis(acetoacetylamino)benzene are dissolved in 250 parts by volume of water and 15 parts by volume of 33% strength sodium hydroxide solution. 125 parts of ice are added to this solution. The coupling component is precipitated by addition of 28 parts by volume of 50% strength acetic acid in the course of one minute.

Coupling:

The diazonium salt suspension, 150 parts of ice and 4 parts of a 30% strength aqueous solution of a coconut alkyl-dimethylamine oxide are initially introduced into a reaction vessel for azo coupling, and the pH is brought to 4 with about 150 parts by volume of 4 molar sodium acetate solution. The suspension of the coupling component is added to this mixture in the course of 20 minutes. When the coupling has ended, the pigment suspension is heated to 98° C. by passing in steam, and this temperature is maintained for 30 minutes. The mixture is allowed to cool to 80° C. and the pigment is filtered off with suction and washed with water. After drying at 65° C., the pigment is ground.

After-treatment:

The ground pigment is heated under reflux in 800 parts by volume of glacial acetic acid for one hour, while stirring. It is filtered off with suction, washed with glacial acetic acid and then with acetone and dried. After grinding, 31.8 parts of a reddish-tinged yellow pigment which decomposes above 334° C. are obtained.

IR spectrum (KBr): 1671, 1625, 1591, 1505, 1478, 1330, 1302, 1290, 1264, 1244, 1228, 1169, 1113, 982, 898, 831, 757, 751, 727 cm$^{-1}$.

Example 15:

Diazonium salt solution:

2.8 parts of 2-(2-amino-5-nitrophenyl)benzothiazole and 21.6 parts of 6-methyl-2-(4-aminophenyl)benzothiazole are stirred in 50 parts by volume of glacial acetic acid and 30 parts by volume of 31% strength hydrochloric acid at about 22° C. for two hours. 500 parts by volume of water are added and the mixture is cooled to 5° C. by addition of ice. 14.3 parts by volume of 38% strength sodium nitrite solution are added dropwise in the course of 15 minutes. Thereafter, the mixture is stirred at 5° C. to 10° C. for 90 minutes. The excess nitrite is then destroyed by addition of amidosulfonic acid.

Dissolving and precipiting the coupling component:

14.2 parts of 1,4-bis(acetoacetylamino)benzene are dissolved in 250 parts by volume of water and 15 parts by volume of 33% strength sodium hydroxide solution. 125 parts of ice are added to this solution. The coupling component is precipitated by addition of 28 parts by volume of 50% strength acetic acid in the course of one minute.

Coupling:

The diazonium salt suspension, 150 parts of ice and 4 parts of a 30% strength aqueous solution of a coconut alkyl-dimethylamine oxide are initially introduced into a reaction vessel for azo coupling, and the pH is brought to 4 with about 50 parts by volume of 4 molar sodium acetate solution. The suspension of the coupling component is added to this mixture in the course of 20 minutes. When the coupling has ended, the pigment suspension is heated to 98° C. by passing in steam, and this temperature is maintained for 30 minutes. The mixture is allowed to cool to 80° C. and the pigment is filtered off with suction and washed with water. After drying at 65° C., the pigment is ground.

After-treatment:

The ground pigment is heated under reflux in 800 parts by volume of glacial acetic acid for 2 hours, while stirring. The pigment is filtered off with suction, washed with glacial acetic acid and then with acetone and dried. After grinding, 34.8 parts of a yellow pigment which does not melt up to 350° C. are obtained.

IR spectrum (KBr): 1660, 1629, 1608, 1526, 1502, 1412, 1360, 1291, 1268, 1211, 1187, 1168, 970, 950, 835, 817 cm$^{-1}$.

We claim:

1. A disazo pigment of the formula (I)

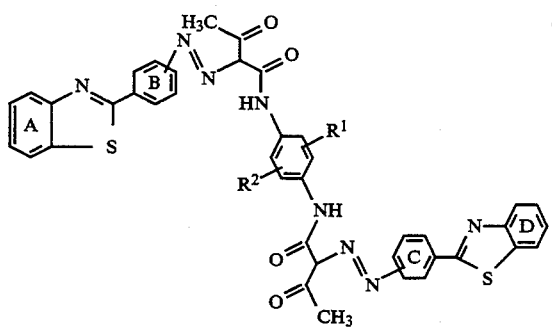

in which $R^1$ and $R^2$ are identical or different and are a hydrogen or halogen atom or a $C_1$–$C_4$-alkyl, $C_1$–$C_4$-alkoxy, $C_1$–$C_5$-alkoxycarbonyl, nitro, cyano or trifluoromethyl group and the rings A, B, C and D independently of one another are; unsubstituted or substituted with one or more substituents selected from the group consisting of $C_1$–$C_4$-alkyl, $C_1$–$C_4$-alkoxy, carboxyl, $C_1$–$C_5$-carbalkoxy, $C_2$–$C_5$-alkanoyl, benzoyl, acyloxy, acylamino, unsubstituted or N-monosubstituted or N,N-disubstituted carbamoyl or unsubstituted or N-monosubstituted or N,N-disubstituted sulfamoyl, the substituents being $C_1$–$C_4$-alkyl or monosubstituted to trisubstituted phenyl; $C_1$–$C_4$-alkylamino or phenylamino; $C_1$–$C_4$-alkylsulfonyl or phenylsulfonyl; phenylsulfonylamino; cyano; halogen, nitro or trifluoromethyl.

2. A disazo pigment as claimed in claim 1 having the formula (II)

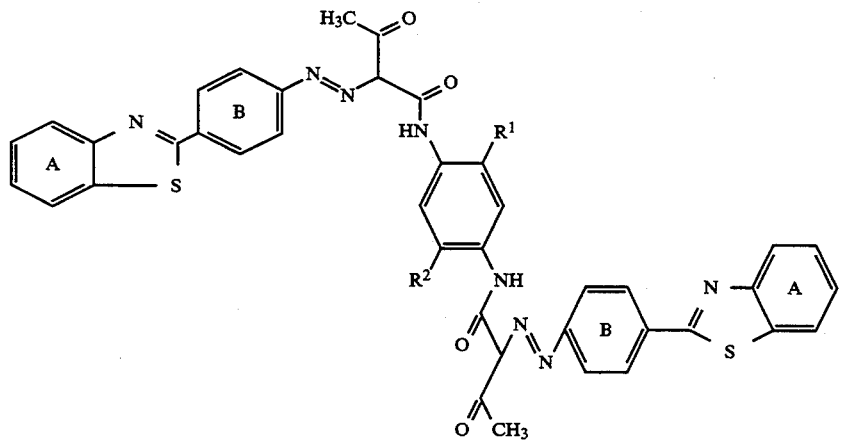

in which the rings A and B in each case independently of one another are substituted by 1 to 3 radicals corresponding to claim 1.

3. A disazo pigment as claimed in claim 2, in which $R^1$ and $R^2$ are identical or different and are a hydrogen or halogen atom, $C_1$–$C_4$-alkyl, $C_1$–$C_4$-alkoxy, nitro, cyano, trifluoromethyl or $C_1$–$C_5$-alkoxycarbonyl.

4. A disazo pigment as claimed in claim 2, in which $R^1$ and $R^2$ are identical or different and are a hydrogen atom, a chlorine or bromine atom, methyl, ethyl, methoxy, ethoxy, propoxy, butoxy, nitro, cyano, trifluoromethyl, methoxycarbonyl or ethoxycarbonyl.

5. A disazo pigment as claimed in claim 2, in which the rings A and B are unsubstituted or independently of one another are substituted by 1 to 3 substitutents selected from the group consisting of methyl, ethyl, methoxy, ethoxy, carboxyl, carbomethoxy, carboethoxy, carbopropoxy, carboisopropoxy, carbobutoxy, acetyl, benzoyl, acetoxy, acetylamino, benzoylamino, unsubstituted or N-monosubstituted or N,N-disubstituted carbamoyl, unsubstituted or N-monosubstituted or N,N-disubstituted sulfamoyl, the substituents being $C_1$–$C_4$-alkyl or monosubstituted to trisubstituted phenyl, $C_1$–$C_4$-alkylamino, phenylamino, $C_1$–$C_4$-alkylsulfonyl, phenylsulfonyl, phenylsulfonylamino, cyano, chlorine, bromine, nitro or trifluoromethyl.

6. A disazo pigment as claimed in claim 1 wherein the structure of formula I is derived from a diazo component and a coupling component; the coupling component being 1,4-bis(acetoacetylamino)benzene, 2,5-dimethyl-1,4-bis(acetoacetylamino)benzene, 2-chloro-1,4-bis(acetoacetylamino)benzene, 2,5-dichloro-1,4-bis(acetoacetylamino)benzene, 2-methoxy-5-methyl-1,4-bis(acetoacetylamino)benzene, 2-methyl-1,4-bis(acetoacetylamino)benzene, 2-methoxy-1,4-bis(acetoacetylamino)benzene, 2,5-dimethoxy-1,4-bis(acetoacetylamino)benzene and the diazo component being one of the diazotization products 6-methyl-2-(4-aminophenyl)benzothiazole, 2-(4-aminophenyl)benzothiazole or 2-(2-amino-5-nitrophenyl)benzothiazole or a combination thereof.

7. A colorant formulation comprising at least one of the disazo pigments as claimed in claim 1.

8. A method of coloring or pigmenting naturally occurring and synthetic materials comprising the step of incorporating a disazo pigment as claimed in claim 1 into said naturally occurring or synthetic materials.

9. A method as claimed in claim 8, wherein the naturally occurring or synthetic material is polystyrene, a polyolefin, a polyacrylic compound, a polyvinyl compound, a polyester, rubber, a case in resin or a silicone resin.

10. A method as claimed in claim 8, wherein the synthetic material is polyethylene, polypropylene, polyvinyl chloride or polyvinyl acetate.

11. A method of preparing a printing ink, an enamel or an emulsion paint, comprising the step of incorporating a disazo pigment as claimed in claim 1 into said printing ink, enamel or emulsion paint.

12. A method of spin coloring artificial silk or of coloring paper comprising the step of incorporating a disazo pigment as claimed in claim 1 into an artificial silk formulation or a dye formulation for the coloring of paper.

* * * * *